United States Patent [19]

Lucy

[11] Patent Number: 5,096,985

[45] Date of Patent: Mar. 17, 1992

[54] POLYHEMIACETAL/CYCLIC ACETAL FROM POLYKETONE

[75] Inventor: Andrew R. Lucy, Camberley, England

[73] Assignee: The British Petroleum Company p.l.c., London, England

[21] Appl. No.: 555,940

[22] Filed: Jul. 20, 1990

[30] Foreign Application Priority Data

Aug. 11, 1989 [GB] United Kingdom ................. 8918394

[51] Int. Cl.$^5$ ............................................. C08G 67/02
[52] U.S. Cl. ..................................... 525/539; 528/392
[58] Field of Search ........................................ 525/539

[56] References Cited

U.S. PATENT DOCUMENTS 4,826,932 5/1989 Wong ................................. 528/392

Primary Examiner—Harold D. Anderson
Attorney, Agent, or Firm—Brooks Haidt Haffner & Delahunty

[57] ABSTRACT

Novel hemiacetalized derivatives of polyketones (linear alternating polymers of carbon monoxide and one or more alkenes are prepared by reacting the polyketone with a diol of formula HOZOH, where $Z=-(C(R)_2)_n-$, the R goups are independently H, OH or $C_1$ to $C_{10}$ alkyl or hydroxyalkyl and n is 2 to 6. The process of preparation is characterized by using a molar ratio of diol to carbonyl groups in the polyketone of at least 5:1.

3 Claims, No Drawings

POLYHEMIACETAL/CYCLIC ACETAL FROM POLYKETONE

The present invention relates to a class of novel polymers called polyhemiacetals and processes for their preparation.

EP patent 121965 discloses a class of polymers, namely polyketones, which can be synthesises by the action of carbon monoxide on alkenes in an alcohol solvent in the presence of a palladium catalyst, a chelate phosphine and the anion of an acid having a pKa less than 2. The anion is one which will not coordinate or only weekly coordinates with the palladium. In addition, acetalisation of carbonyl compounds can be carried out by an acid catalysed reaction in which water is removed by azeotropic distillation during the reaction.

It has been found that there is a problem with the use of polyketones described previously since such materials have high melting points and poor solubility in anything other than extremely expensive or high boiling solvents. Furthermore in the case of ethene/CO copolymers, melting in general is accompanied by decomposition. We have now found anew class of polymers which can be synthesised by acetalisation of polyketones whereby the polymer may also be prepared directly by modification of the polyketone synthesis.

Accordingly the present invention comprises a polymer comprising a plurality of one or more types of unit of general formula:

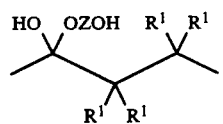

(I)

where $R^1$ groups are independently selected from H or $C_1$ or $C_{10}$ alkyl and where Z is a group having the formula $-(C(R)_2)_n-$ where R can be independently selected from H, OH and $C_1$ to $C_{10}$ alkyl or hydroxyalkyl and n is 2 to 6.

The present invention solves the problem by providing a class of polymers (polyhemiacetals) which unlike the polyketones are easy to process. It has been found that the new polymers are stable, and melt at relatively low temperatures without apparent decomposition, unlike the corresponding polyketones which in general decompose significantly on melting. Furthermore, the polymers are readily soluble in a range of solvents for example tetrahydrofuran and dichloromethane. By contrast polyketones are soluble only in expensive solvents such as hexafluoroisopropanol or high boiling solvents such as meta-cresol.

Considering the formula given above, the $R^1$ groups are independently selected from H or $C_1$ or $C_{10}$ alkyl. It is most prefered that $R^1$ groups are selected from $C_1$ to $C_4$ alkyl, most preferably H or methyl. As regards Z, this is a divalent group having the formula $-(C(R)_2)_n-$ where R can be independently selected from H, OH and $C_1$ to $C_{10}$ alkyl or hydroxyalkyl and n is 2 to 6. Preferred R groups are H, OH, $C_1$ to $C_6$ alkyl or hydroxy alkyl and n is preferably 2 to 4. Most prefered examples are where Z is selected from $-CH_2-CH_2-$, $-CH_2-CH(CH_3)-$ and $-CH(CH_3)-$.

Whilst the polymer of the present invention may consist exclusively of units of the general formula given above it is envisaged that the polymer may also contain other units. In particular, it will be appreciated, especially where the polymer has been produced by hemiacetalisation of a corresponding polyketone, that the polymer may contain one or more type of unit having the formula:

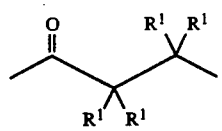

(II)

wherein the $R^1$ groups are as described previously.

The polymer may also contain one or more type of unit having the formula:

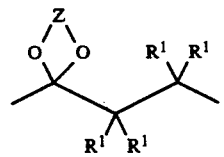

(III)

where $R^1$ groups are independently selected from H or $C_1$ to $C_{10}$ alkyl and where Z is a group having the formula $-(C(R)_2)_n-$ where R can be independently selected from H, OH and $C_1$ and $C_{10}$ alkyl or hydroxy alkyl and n is 2 to 6.

It will be appreciated that when the corresponding polyketone is comprised of units of the formula:

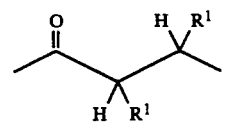

(IV)

where $R^1$ groups are optionally H then the polymer may also be comprised of one or more types of units of the general formula:

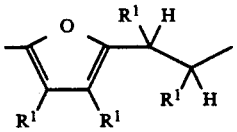

(V)

Preferably the polymers are comprised of at least 50% by weight of units of formula I and III, most preferably 75% or more. In such preferred polymers the molar ratio of units of formula (I) to units of formula (III) is at least 0.2:1 preferably at least 0.5:1.

The polymers defined above can be prepared by a process which comprises the step of hemiacetalising a polyketone consisting of one or more units of formula (II) by for example reacting the polyketone with a diol of formula HOZOH in the presence of an acid catalyst. Such polyketones which are linear alternating polymers of carbon monoxide and one or more alkenes are described eg in EP 121965 or EP 213671. the process is preferably carried out at temperatures in the range 0°-150° C. and suitable acid catalysts include para-toluenesulphonic acid, dilute mineral acids and the like. In preparing the polymer it is preferred that any water generated during the process is not removed from the reaction medium. The removal of water generated during the process will result in a relative increase in the number of units of formula III in the polymer. At the end of the reaction, the polymer is separated from the other reaction products ie. water and unreacted diol.

The process for preparing the polymer is effected in the presence of a large excess of diol ie the molar ratio of diol to carbonyl groups in the polyketone should be at least 5:1 and preferably in the range 50:1 to 500:1. Lower amounts of diol as employed in the processes defined in Australian patent application tend to produce units of formula (III) and (V) at the expense of units of formula (I).

Alternatively the polymer may be prepared by reacting carbon monoxide with an olefin of formula —$(C(R^1)_2)$— in the presence of diol Z of formula HOZOH and an effective amount of a catalyst prepared from eg a palladium compound, achelate phosphate, an anion of an acid which either does not coordinate or weakly coordinates with palladium.

As regards the catalyst such material shave been described previously in EP 121965. In the process of the present invention it is believed, although it remains to be confirmed, that the active catalyst is a palladium complex having the formula $LPdS_2^{2+}2Q^-$ or $LPdS^{2+}2Q^-$ where L is a the chelate phosphine, S is the diol and Q is the weakly or non co-ordinating anion.

Suitably, the process is carried out at a temperature in the range of 40°-140° C. and at a pressure in the range of 2-10 MPa. Suitably the reaction is carried out using the diol as the solvent although mixtures of a diol and another solvent can be used. Both processes defined above may be carried out batchwise or continuously.

The following examples illustrate the invention.

A: Preparation of Polyketone derived from ethene and CO

A precursor solution was prepared by boiling a mixture of palladium acetate (27 mg) 1,3 bis-(diphenylphosphino) propane (68 mg), dimethylformamide (0.01 cm$^3$) and methanol (10 cm$^3$) until and homogenous solution was obtained. The mixture was cooled and filtered.

A stainless steel autoclave (300 cm$^3$) was charged with 0.599 g of $H[B(OC_6H_4CO_2)_2]$ as described in EP 314309 and 100 cm$^3$ of methanol and then after sealing purged with a 1:1 mixture of CO and ethene to remove air. The vessel was then pressurised to 2.5 MPa with the 1:1 mixture and thereaftter heated to 100° C. whilst the contents were stirred. On reaching temperature, the catalyst solution was injected into the vessel and the pressure raised further to 5 MPa using the same 1:1 mixture.

The reaction temperature was maintained at 100° C. and a pressure of 5 MPa bar maintained by applying a continuous feed of the 1:1 mixture for four and a half hours. The vessel was then cooled, opened and the polymer collected by filtration of the reaction mixture. The polymer was then washed sequentially with methanol and acetone and dried to constant weight. A yield of 27.37 g of product was obtained.

EXAMPLE 1

A 250 cm$^3$ round bottom flask containing a magnetic stirrer was charged with 0.1 g of the ethene/CO polyketone prepared as described in A above, para-toluenesulphonic acid (20 mg), toluene (100 cm$^3$) and 1,2-propanediol (50 cm$^3$). The flask was then fitted with a water-cooled condenser. The reaction mixture was stirred and boiled under reflux for two hours and then allowed to cool.

the toluene phase was then added to 50 cm$^3$ of water containing 0.1 g of NaOH. The aqueous phase was separated off, the toluene phase washed repeatedly with saturated brine and then dried over magnesium sulphate. The liquors were filtered and evaporated to dryness to give 1.5 g of an oil. $^1$H-NMR spectroscopy indicated that the oil was comprised of units of formulae I and II (molar ratio 0.5:1) where Z is —$CH_2$—$CH(CH_3)$— and R$^1$ are H.

EXAMPLE 2

A stainless steel Roth autoclave, of nominal 100 cm$^3$ volume, was fitted with a glass liner containing a stirrer bar. The gap between the glass liner and the metal autoclave well was partially filled with 7 g of n-decane to assist heat conduction. The glass liner was charged wit 1,2-propanediol (10 cm$^3$), toluene (10 cm$^3$), para-toluenesulphonic acid (9.7 mg) and 7.55 mg of $[Pd(dppp)(PhCN)_2][BF_4]_2$, where dppp is bis (1,3-diphenylphoshino) propane. The vessel was closed and pressurised to 2.5 MPa with ethene. Carbon monoxide was added to give a total pressure of 4.5 MPa. The vessel was then sealed and the contents stirred. The temperature was increased to 110° C. and maintained at that temperature for three hours.

The vessel was cooled, opened and the glass liner found to contain two liquid phases and a glutinous solid. The aqueous phase was separated off, the toluene phase washed three times with saturated brine and dried over magnesium sulphate. The liquors were filtered and evaporated to dryness to give 0.76 g of a yellow oil. A further 0.9 g of the product was obtained by dissolving the glutinous solid from the glass liner in 25 cm$^3$ of toluene and working it up in a similar manner. $^1$H-NMR spectroscopy indicated that the product comprised units of formula I and II where Z is —CH—CH(CH$_3$)— and R$^1$ are H.

I claim:

1. A polymer comprising a plurality of one or more units of the general formula:

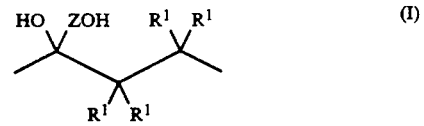

(I)

where the R$^1$ groups are independently selected from the group consisting of H or C$_1$ to C$_{10}$ alkyl and where Z is a group having the formula —$(C(R)_2)$—$_n$ where R is independently selected from the group consisting of H, OH and C$_1$ to C$_{10}$ alkyl or hydroxyalkyl and n is 2 to 6.

2. A polymer as claimed in claim 1 further comprising one or more units having the formula:

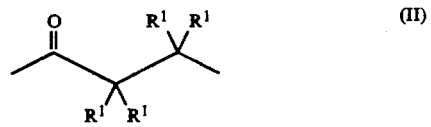

(II)

3. A polymer as claimed in claim 1 in either claim 1 or 2 further comprising one or more units having the formula:

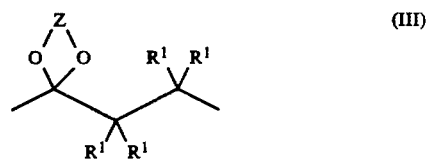

(III)

* * * * *

UNITED STATES PATENT AND TRADEMARK OFFICE
CERTIFICATE OF CORRECTION

PATENT NO. : 5,096,985
DATED : March 17, 1992
INVENTOR(S) : ANDREW R. LUCY It is certified that error appears in the above-identified patent and that said Letters Patent is hereby corrected as shown below:

Col. 1, line 9, "syntheseses" should read --synthesised--.

Col. 1, line 24; should read "found a new class of"

Col. 1, line 29; after "of" and before "general" insert --the--

Col. 2, line 61; "The process" starts a new sentence

Col 3, line 43; correct the spelling of the word "thereafter"

Col. 3, line 65; "The toluene phase" starts a new paragraph

Col. 4, line 12; correct the spelling of the word "with"

Signed and Sealed this

Thirty-first Day of August, 1993

*Attest:*

BRUCE LEHMAN

*Attesting Officer*    *Commissioner of Patents and Trademarks*